United States Patent [19]

Sigmund

[11] Patent Number: 5,556,333
[45] Date of Patent: Sep. 17, 1996

[54] AIR-DISTRIBUTOR BOX

[75] Inventor: Günther Sigmund, Sindelfingen, Germany

[73] Assignee: Mercedes-Benz AG, Germany

[21] Appl. No.: 353,239

[22] Filed: Dec. 2, 1994

[30] Foreign Application Priority Data

Dec. 2, 1993 [DE] Germany .................. 4341056.1

[51] Int. Cl.$^6$ ...................................... B60H 1/26
[52] U.S. Cl. .......................................... 454/143; 454/152
[58] Field of Search .................................. 454/124, 143, 454/144, 152

[56] References Cited

U.S. PATENT DOCUMENTS

| | | | |
|---|---|---|---|
| 1,754,441 | 3/1930 | Campbell | 454/152 |
| 3,388,654 | 6/1968 | Aldrich, Jr. et al. | 454/152 |

FOREIGN PATENT DOCUMENTS

| | | | |
|---|---|---|---|
| 1054992 | 2/1954 | France | 454/143 |
| 3925726A1 | 2/1991 | Germany . | |
| 130807 | 8/1982 | Japan | 454/152 |
| 896340 | 5/1962 | United Kingdom . | |
| 1287362 | 8/1972 | United Kingdom . | |
| 1361188 | 7/1974 | United Kingdom . | |
| 2012417 | 7/1979 | United Kingdom . | |
| 2106637 | 4/1983 | United Kingdom . | |
| 90/00258 | 10/1990 | WIPO . | |

*Primary Examiner*—Harold Joyce
*Attorney, Agent, or Firm*—Evenson, McKeown, Edwards & Lenahan, P.L.L.C.

[57] ABSTRACT

An air-distributor box for a heating/air-conditioning system of motor vehicles has a first air-outflow orifice for the connection of a lateral nozzle and a second air-outflow orifice, arranged below the first air-outflow orifice, for ventilating the foot space as well as an air flap controlling the air stream to the second air-outflow orifice. In order to avoid the lateral nozzle having to be additionally throttled by hand from outside by the driver or front-seat passenger with the air flap opened for ventilating the foot space to a sufficient extent, the first air-outflow orifice to the lateral nozzle is assigned a throttle diaphragm. The diaphragm is positively coupled to the air flap so that the throttle diaphragm throttles the orifice cross-section of the first air-outflow orifice to the maximum extent in an open position of the air flap allowing the full air stream to the second air-outflow orifice and exposes it completely in the closing position of the air flap shutting off the air stream to the second air-outflow orifice.

7 Claims, 2 Drawing Sheets

AIR-DISTRIBUTOR BOX

BACKGROUND AND SUMMARY OF THE INVENTION

The present invention relates to an air-distributor box for a heating or air-conditioning system of motor vehicles, and more particularly, to an air-distribution box with a first air-outflow orifice for connection of a lateral nozzle arranged laterally in a motor vehicle, a second air-outflow orifice arranged below the first air-outflow orifice for ventilating a motor vehicle foot space, and an air flap controlling an air stream to the second air-outflow orifice.

In the air-distributor box described, for example, in DE 3,925,726 A1, the arrangement of the second air-outflow orifice for ventilating the foot space underneath the first air-outflow orifice for the lateral nozzle presents the problem that, with the air flap opened, air is supplied to the foot space to only an insufficient extent when the air supply to the lateral nozzles is not throttled on the outside at the lateral nozzles by flaps present there. This insufficient air supply to the foot space becomes noticeable particularly when the heating is in operation.

Although such insufficient ventilation of the foot space could possibly be rectified by making the orifice cross-section of the first air-outflow orifice to the lateral nozzle substantially smaller than the orifice cross-section of the second air-outflow orifice for ventilating the foot space, such a reduction in cross section is nevertheless forbidden on account of the air requirement of the lateral nozzle in the event of maximum ventilation or cooling of the passenger compartment.

An object on which the present invention is based is to provide an air-distributor box in which there is no need for the outer throttling of the lateral nozzle for the purpose of a sufficient heating of the foot space when the air flap is open.

The foregoing object has been achieved according to the present invention by providing that the first air-outflow orifice is associated with a throttle diaphragm arranged to control an orifice cross-section of the first air-outflow orifice, and the throttle diaphragm and air flap are positively coupled such that the throttle diaphragm maximally throttles the orifice cross-section of the first air-outflow orifice in the open position of the air flap allowing a full air stream to the second air-outflow orifice and exposes the orifice cross section of the first air outflow orifice completely in a closing position of the air flap shutting off the air stream to the second air-outflow orifice.

An advantage of the air-distributor box according to the present invention is that, as a result of the throttle diaphragm at the air-outflow orifice to the lateral nozzle and its coupling to the air flap for ventilating the foot space, when the air flap is opened for ventilating the foot space, the orifice cross-section of the air outflow orifice to the lateral nozzle is automatically throttled correspondingly. Thus, a sufficient ventilation of the foot space is ensured, without the need for additional manipulations on the lateral nozzle. When the air flap is closed, the throttle diaphragm exposes the first air-outflow orifice completely, and when it is opened completely the orifice cross-section of the first air-outflow orifice is reduced to the maximum extent. Between these two end positions, i.e., "foot-space air flap closed" and "foot-space air flap fully open", a continuous closing of the air-outflow orifice by the throttle diaphragm is obtained for the supply of air to the lateral nozzle.

In one preferred embodiment of the present invention, the throttle diaphragm is configured so that maximum throttling does not create a total air shut-off relative to the lateral nozzle, but there is still a residual cross section for a minimum air flow in the air-outflow orifice. This residual cross-section is preferably selected so that the residual air stream corresponds approximately to that which would flow out via the lateral nozzle in the event of an outer throttling of the lateral nozzle to less than half.

A simple constructive implementation of the throttle diaphragm is achieved by using as a throttle diaphragm a plate-shaped rotary slide which is rotatable parallel to the plane of the first air-outflow orifice about a pivot axis oriented at right angles thereto. The rotary slide preferably has the form of a circular segment, and its pivot axis is arranged near one edge of the first air-outflow orifice of rectangular configuration. If the first air-passage orifice is, for example, made square and the form of a segment of a circle of the rotary slide has a segment angle of approximately 90° and a circle radius which is a little smaller than the side length of the square air-outflow orifice, then approximately the above-defined maximum throttling of the air passage cross-section in the first air-outflow orifice is achieved.

A coupling rod invention is used for the positive coupling of the throttle diaphragm and air flap, which coupling rod, with the pivot axes of the throttle diaphragm and air flap oriented in parallel, is articulated on the air flap and on the throttle diaphragm of joint axes parallel to the pivot axes.

BRIEF DESCRIPTION OF THE DRAWINGS

These and other objects, features and advantages of the present invention will become more readily apparent from the following detailed description thereof when taken in conjunction with the accompanying drawings wherein.

DETAILED DESCRIPTION OF THE DRAWINGS

Figure 1:
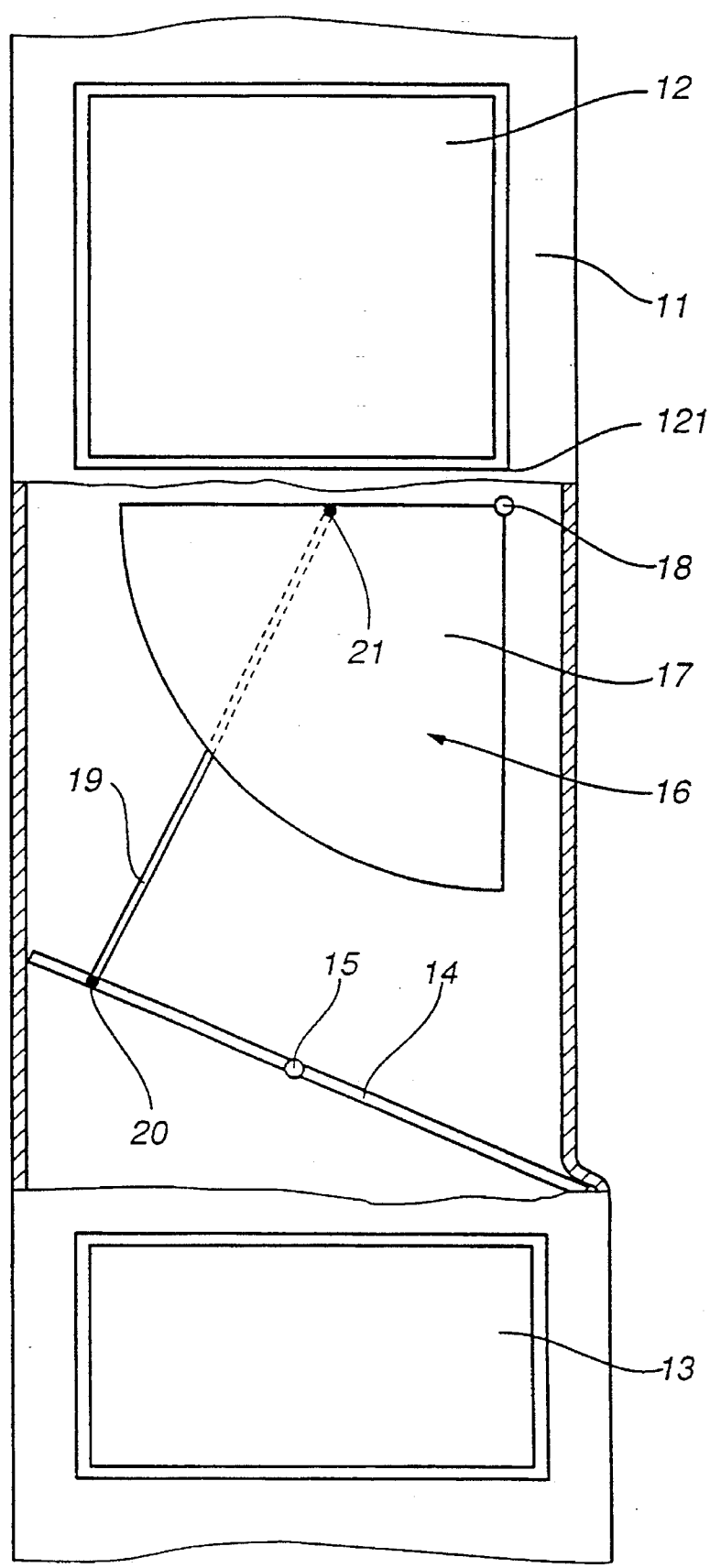
FIGS. 1 and 2 are partial cross-sectional reviews of an air distributor box for an air-conditioning system of a motor vehicle, with air-outflow orifices for the lateral nozzle and foot space and with control flaps, in two different pivoting positions of the control flaps.

Of the air-distributor box, represented merely in cutout or partial cross-sectional form in FIG. 1, for an air-conditioning or heating system of a motor vehicle, only a left-hand lateral channel 11 is shown. In the lateral channel 11, there is provided a first air-outflow orifice 12 for the connection of a lateral nozzle arranged in the dashboard of the motor vehicle, and a second air-outflow orifice 13 located below the first air-outflow orifice. An air flap 14 with a pivot axis 15 is configured and arranged in the lateral channel 11 in front of the second air-outflow orifice 13 such that it can cover the entire flow cross-section in the lateral channel 11 towards the second air-outflow orifice 13. This closing position of the air flap 14 is shown in FIG. 1. By manually actuating the air flap 14, the latter can be pivoted into an open position (FIG. 2), in which the flap 14 is oriented essentially parallel in the lateral channel 11.

The first air-outflow orifice 12 for the connection of the lateral nozzle can have any, for example square, orifice cross-section, the size of which is controlled by a throttle diaphragm 16. In the illustrated embodiment, the throttle diaphragm 16 is a plate-shaped rotary slide 17 which is rotatable parallel to the plane of the air-outflow orifice 12 about a pivot axis 18 which is oriented at right angles thereto and which runs parallel to the pivot axis 15 of the air flap 14, and is arranged near one lower corner edge 121 of the first air-outflow orifice 12. The rotary slide 17 has the form of a segment of a circle, the segment angle amounting to 90° and the circle radius being a little smaller than the side length of the square air-outflow orifice 12.

Figure 2:
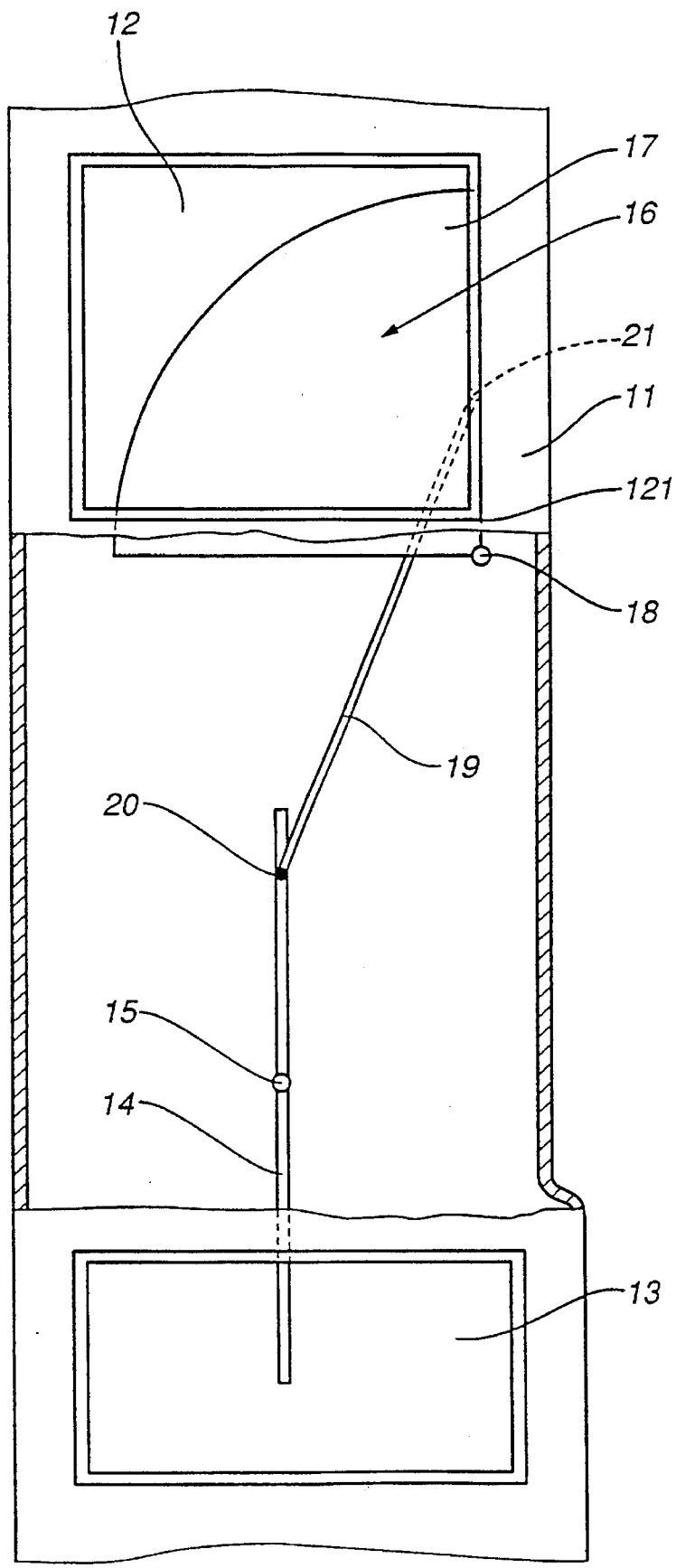

In FIG. 1, the throttle diaphragm 16 assumes a position, in which the orifice cross-section of the first air-outflow orifice 12 is exposed completely. FIG. 2 shows the throttle diaphragm 16 in a pivoting position, in which it throttles the orifice cross-section of the first air-outflow orifice 12 to the maximum extent. It can be seen clearly that this maximum throttling does not lead to a complete shut-off of the first air-outflow orifice 12, but there is still a residual orifice cross section which allows the passage of a residual air quantity.

The throttle diaphragm 16 is now positively coupled to the air flap 14 so that the throttle diaphragm 16 throttles the orifice cross-section of the first air-outflow orifice 12 to the maximum extent in the open position of the air flap 14 allowing the full air stream to the second air-outflow orifice 13 (FIG. 2) and exposes it completely in the closing position of the air flap 14 shutting off the air stream to the second air-outflow orifice 13 (FIG. 1). For this purpose, the throttle diaphragm 16 and air flap 14 are connected to one another in an articulated manner via a coupling rod 19, with the joint axes of the coupling joints 20, 21 being oriented parallel to the pivot axes 15, 18 of the air flap 14 and throttle diaphragm 16.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An air-distributor box for a motor vehicle heating air-conditioning system, comprising a first air outflow orifice for connection of a lateral nozzle arranged laterally in a motor vehicle dashboard, a second air-outflow orifice arranged below the first air-outflow orifice for ventilating a motor vehicle foot space, and an air flap controlling an air stream to the second air-outflow orifice, wherein the first air-outflow orifice is associated with a throttle diaphragm arranged to control an orifice cross-section of the first air-outflow orifice, and the throttle diaphragm and air flap are positively coupled such that the throttle diaphragm maximally but not completely throttles the orifice cross section of the first air-outflow orifice in the open position of the air flap allowing a full air stream to the second air-outflow orifice and exposes the orifice cross section of the first air outflow orifice completely in a closing position of the air flap shutting off the air stream to the second air-outflow orifice, whereby, when the orifice cross-section of the first air-outflow orifice is throttled to the maximum extent by the throttle diaphragm, an incomplete covering of the first air-outflow orifice occurs.

2. The air-distributor box according to claim 1, wherein the air flap and throttle diaphragm have parallel pivot axes which, and for positive coupling of the air flap and throttle diaphragm, a coupling rod is articulated on the air flap and on the throttle diaphragm by joint axes parallel to the pivot axes.

3. An air-distributor box for a motor vehicle heating air-conditioning system, comprising a first air outflow orifice for connection of a lateral nozzle arranged laterally in a motor vehicle dashboard, a second air-outflow orifice arranged below the first air-outflow orifice for ventilating a motor vehicle foot space, and an air flap controlling an air stream to the second air-outflow orifice, wherein the first air-outflow orifice is associated with a throttle diaphragm arranged to control an orifice cross-section of the first air-outflow orifice, and the throttle diaphragm and air flap are positively coupled such that the throttle diaphragm maximally but not completely throttles the orifice cross section of the first air-outflow orifice in the open position of the air flap allowing a full air stream to the second air-outflow orifice and exposes the orifice cross section of the first air outflow orifice completely in a closing position of the air flap shutting off the air stream to the second air-outflow orifice, the throttle diaphragm is a plate-shaped rotary slide arranged rotatably parallel to the plane of the air-outflow orifice about a pivot axis at right angles thereto.

4. The air-distributor box according to claim 3, wherein when the orifice cross-section of the first air-outflow orifice is throttled to the maximum extent by the throttle diaphragm, an incomplete covering of the first air-outflow orifice occurs.

5. The air-distributor box according to claim 3, wherein the rotary slide has a circular segment form, and the pivot axis is arranged adjacent one corner edge of the first air-outflow orifice which has a rectangular configuration.

6. The air-distributor box according to claim 5, wherein the first air-outflow orifice has a square form, the circular segment form of the rotary slide has a segment angle of approximately 90° and a radius which is smaller than a side length of the air-outflow orifice.

7. The air-distributor box according to claim 3, wherein the air flap and throttle diaphragm have parallel pivot axes which, and for positive coupling of the air flap and throttle diaphragm, a coupling rod is articulated on the air flap and on the throttle diaphragm by joint axes parallel to the pivot axes.

* * * * *